(12) United States Patent
Shimizu et al.

(10) Patent No.: US 11,766,751 B2
(45) Date of Patent: Sep. 26, 2023

(54) LASER MACHINE

(71) Applicant: KOMATSU INDUSTRIES CORPORATION, Kanazawa (JP)

(72) Inventors: Youichirou Shimizu, Komatsu (JP); Takayuki Saisu, Komatsu (JP)

(73) Assignee: KOMATSU INDUSTRIES CORPORATION, Kanazawa (JP)

( * ) Notice: Subject to any disclaimer, the term of this patent is extended or adjusted under 35 U.S.C. 154(b) by 630 days.

(21) Appl. No.: 16/603,365

(22) PCT Filed: Apr. 18, 2018

(86) PCT No.: PCT/JP2018/015949
§ 371 (c)(1),
(2) Date: Oct. 7, 2019

(87) PCT Pub. No.: WO2019/003596
PCT Pub. Date: Jan. 3, 2019

(65) Prior Publication Data
US 2021/0086318 A1 Mar. 25, 2021

(30) Foreign Application Priority Data

Jun. 29, 2017 (JP) .................................. 2017-127365

(51) Int. Cl.
*B23Q 1/44* (2006.01)
*B23K 26/70* (2014.01)
(Continued)

(52) U.S. Cl.
CPC .............. *B23Q 1/44* (2013.01); *B23K 26/127* (2013.01); *B23K 26/706* (2015.10); *B23K 37/04* (2013.01); *B65G 47/80* (2013.01); *B23K 26/36* (2013.01)

(58) Field of Classification Search
CPC ...... B23Q 1/44; B23K 26/706; B23K 26/127; B23K 26/36; B23K 37/04; B65G 47/80
(Continued)

(56) References Cited

U.S. PATENT DOCUMENTS 4,205,216 A * 5/1980 Douglas ............. B23K 26/0823
198/950
4,730,113 A * 3/1988 Edwards ................. F16P 3/147
250/342
(Continued)

FOREIGN PATENT DOCUMENTS

CN 103123946 A 5/2013
CN 204771149 U 11/2015
(Continued)

OTHER PUBLICATIONS

Machine English Translation of JP5300185B2 (Year: 2013).*
Machine English Translation of CN-106847054-A (Year: 2017).*
Machine English Translation of EP-3141332-A1 (Year: 2017).*

*Primary Examiner* — Sang Y Paik
*Assistant Examiner* — Erwin J Wunderlich
(74) *Attorney, Agent, or Firm* — Faegre Drinker Biddle & Reath LLP

(57) ABSTRACT

Provided is a laser machine which achieves an enhanced durability against laser beam irradiation. A workpiece transfer device for carrying a workpiece into and out of a workpiece machining chamber, has a turntable device and a partition wall. The partition wall is secured to the top surface of the turntable device, partitioning the top surface of the turntable device into a plurality of workpiece mounting tables on which workpieces can be mounted. The partition wall has: a first plate forming one surface of the partition wall and formed of aluminum alloy; a second plate forming the other surface of the partition wall and formed of alumi-
(Continued)

num alloy; and a frame for securing the first plate and the second plate in a spaced apart relationship.

4 Claims, 6 Drawing Sheets

(51) Int. Cl.
    *B23K 26/12*     (2014.01)
    *B23K 37/04*     (2006.01)
    *B65G 47/80*     (2006.01)
    *B23K 26/36*     (2014.01)

(58) Field of Classification Search
    USPC ................................ 414/222.01; 219/121.86
    See application file for complete search history.

(56) References Cited

U.S. PATENT DOCUMENTS

| | | | | |
|---|---|---|---|---|
| 5,101,089 | A * | 3/1992 | Bortolotto | B23K 26/1482 |
| | | | | 219/121.63 |
| 5,274,212 | A * | 12/1993 | Campbell | B23K 26/127 |
| | | | | 269/224 |
| 5,464,963 | A * | 11/1995 | Hostler | B23K 26/127 |
| | | | | 219/121.6 |
| 5,658,476 | A | 8/1997 | Gullo et al. | |
| 6,147,320 | A * | 11/2000 | Bernecker | B23K 26/127 |
| | | | | 219/121.68 |
| 6,147,323 | A * | 11/2000 | Erickson | B23K 26/127 |
| | | | | 219/121.82 |
| 6,314,686 | B1 * | 11/2001 | Scherer | B23K 26/706 |
| | | | | 219/121.21 |
| 8,829,889 | B2 * | 9/2014 | Hannweber | B23K 26/706 |
| | | | | 340/557 |
| 10,518,360 | B2 * | 12/2019 | Brown | B23K 26/706 |
| 10,610,967 | B2 * | 4/2020 | Mottin | B23K 26/12 |
| 11,167,389 | B2 * | 11/2021 | Doettling | B23K 26/706 |
| 2013/0326965 | A1 * | 12/2013 | Darzi | B23K 37/0461 |
| | | | | 52/2.14 |

FOREIGN PATENT DOCUMENTS

| | | | |
|---|---|---|---|
| CN | 205257381 U | 5/2016 | |
| CN | 106847054 A * | 6/2017 | ............. B33Y 30/00 |
| EP | 3141332 A1 * | 3/2017 | |
| JP | 2004-25216 A | 1/2004 | |
| JP | 2008-43973 A | 2/2008 | |
| JP | 2009-233726 A | 10/2009 | |
| JP | 5300185 B2 * | 9/2013 | ............. B33Y 30/00 |

* cited by examiner

LASER MACHINE

TECHNICAL FIELD

The present invention relates to a laser machine.

BACKGROUND ART

Conventionally, laser machines comprising a rotary workpiece transfer device are known. Japanese Patent Laying-Open No. 2008-43973 (PTL 1) discloses a laser machine which obstructs a workpiece transfer port with a blocking wall, in conjunction with the workpiece transfer device carrying the workpiece into a workpiece machining chamber.

CITATION LIST

Patent Literature

PTL 1: Japanese Patent Laying-Open No. 2008-43973

SUMMARY OF INVENTION

Technical Problem

In laser machines, a laser emitting device which emits a laser beam to a workpiece, is accommodated in a workpiece machining chamber. A structure that surrounds the laser emitting device needs to have durability that can withstand the emission of the laser beam.

An object to the present invention is to provide a laser machine which achieves an enhanced durability against laser beam irradiation.

Solution to Problem

A laser machine according to the present invention includes a laser emitting device, a workpiece machining chamber, and a workpiece transfer device. The laser emitting device emits a laser beam to a workpiece to machine the workpiece. The workpiece machining chamber accommodates the laser emitting device. The workpiece machining chamber has a side wall. The side wall has a workpiece transfer port through which a workpiece is carried into and out of the workpiece machining chamber. The workpiece transfer device carries the workpiece into and out of the workpiece machining chamber. The workpiece transfer device has a turntable device and a partition wall. The turntable device is configured to rotate in the workpiece transfer port. The partition wall is secured to a top surface of the turntable device. The partition wall partitions the top surface of the turntable device into a plurality of workpiece mounting tables on which the workpiece can be mounted. Along with rotation of the turntable device, the partition wall blocks the workpiece transfer port and prevents the laser beam emitted by the laser emitting device from leaking out of the workpiece machining chamber through the workpiece transfer port. The partition wall has a first plate forming one surface of the partition wall and formed of aluminum alloy, a second plate forming an other surface of the partition wall and formed of aluminum alloy, and a frame for securing the first plate and the second plate in a spaced apart relationship.

Advantageous Effects of Invention

According to the laser machine of the present invention, enhanced durability against laser beam irradiation is achieved.

DESCRIPTION OF EMBODIMENTS

Hereinafter, an embodiment will be described, with reference to the accompanying drawings. In the following description, the same reference signs refer to the same components. Their names and functionalities are also the same. Therefore, detailed description thereof will not be repeated. In the following, the description will be given, with reference to a three-dimensional Cartesian coordinate system (XYZ coordinate system).

Figure 1:
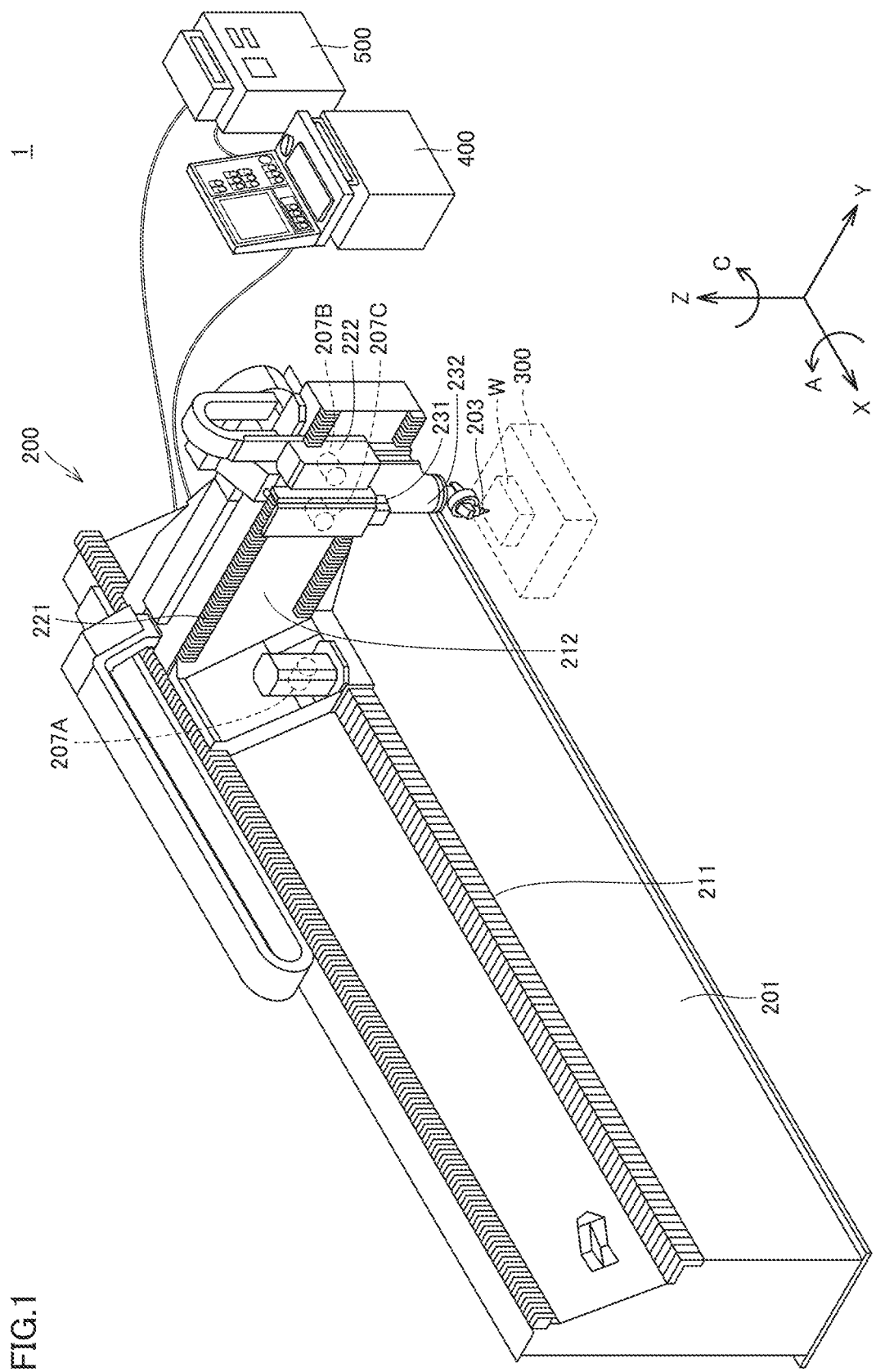
FIG. 1 is a perspective view showing a schematic configuration of a laser machine.

FIG. 1 is a perspective view showing a schematic configuration of a laser machine 1. Laser machine 1 is, by way of example, a fiber laser machine. Laser machine 1 emits a laser beam to a workpiece W (a machining object, a machined member), and cuts and bores workpiece W, thereby machining workpiece W into a desired shape.

Laser machine 1 is a three-dimensional laser machine which supports five-axis (X-axis, Y-axis, Z-axis, C-axis, A-axis) control. In the present embodiment, directions that are orthogonal to each other in a given plane that is in parallel with the surface of the floor on which laser machine 1 is installed, are X-axis direction and Y-axis direction. A direction that is orthogonal to X-axis direction and Y-axis direction is Z-axis direction. Z-axis direction is perpendicular to the surface of the floor. X-axis is orthogonal to YZ-plane. Y-axis is orthogonal to XZ-plane. Z-axis is orthogonal to XY-plane. XY-plane includes X-axis and Y-axis. XZ-plane includes X-axis and Z-axis. YZ-plane includes Y-axis and Z-axis. A direction of rotation about X-axis is A-axis direction. A direction of rotation about Z-axis is C-axis direction.

As shown in FIG. 1, laser machine 1 includes a laser emitting device 200, a workpiece transfer device 300, a controller 400, and an oscillator 500. Laser emitting device 200 is installed in a workpiece machining chamber 600 not shown in FIG. 1. Controller 400 and oscillator 500 are installed outside the workpiece machining chamber 600.

Controller 400 is communicably connected to laser emitting device 200, a drive (not shown) for driving workpiece transfer device 300, and oscillator 500. Controller 400 controls operation of laser emitting device 200, operation of workpiece transfer device 300, and operation of oscillator 500.

Oscillator 500 oscillates a laser beam, based on a command from controller 400. The oscillated laser beam is sent to laser emitting device 200 via an optic fiber.

Workpiece W is placed on workpiece transfer device 300. Workpiece transfer device 300 carries workpiece W into and out of workpiece machining chamber 600, based on commands from controller 400. Details of workpiece transfer device 300 will be described below.

Laser emitting device 200 emits a laser beam, sent from oscillator 500, to workpiece W. Laser emitting device 200 has a base member 201, a machine head 203, servomotors 207A, 207B, 207C, guide members 211, 221, 231, and movable members 212, 222, 232.

Servomotors 207A, 207B, 207C are driven based on commands from controller 400.

Guide member 211 is provided on base member 201. Movable member 212 is movably supported by guide member 211. Movable member 212 is moved by servomotor 207A. The movement of movable member 212 moves machine head 203 in the positive direction and negative direction of X-axis.

Guide member 221 is provided on movable member 212. Movable member 222 is movably supported by guide member 221. Movable member 222 is moved by servomotor 207B. The movement of movable member 222 moves machine head 203 in the positive direction and negative direction of Y-axis.

Guide member 231 is provided on movable member 222. Movable member 232 is movably supported by guide member 231. Movable member 232 is moved by servomotor 207C. The movement of movable member 232 moves machine head 203 in the positive direction and negative direction of Z-axis.

According to such a configuration, controller 400 moves machine head 203 in X-axis direction, Y-axis direction, and Z-axis direction, thereby positioning machine head 203.

Figure 2:
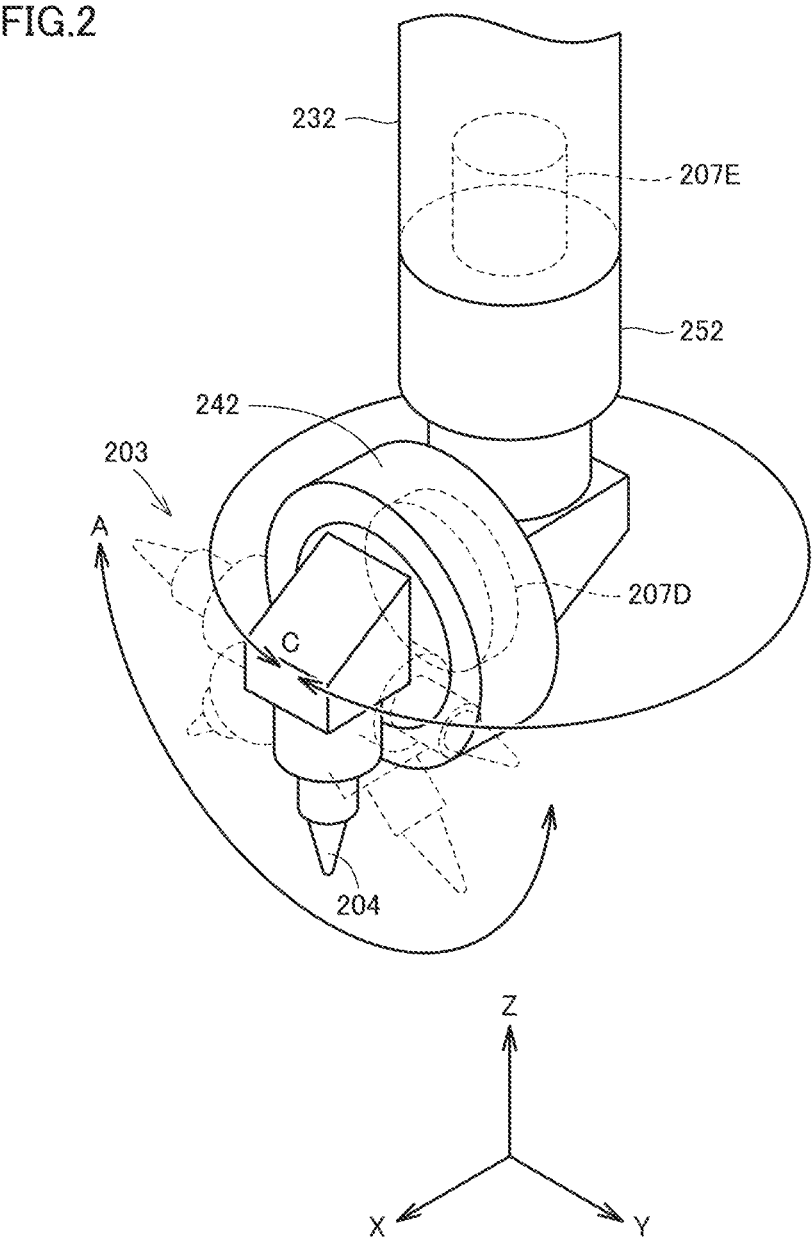
FIG. 2 is an enlarged perspective view of a machine head.

FIG. 2 is an enlarged perspective view of machine head 203. As shown in FIG. 2, laser emitting device 200 further has a nozzle 204, servomotors 207D, 207E and movable members 242, 252, in addition to machine head 203 and movable member 232.

Nozzle 204 is located on the tip of machine head 203. The laser beam, sent from oscillator 500 to laser emitting device 200 is emitted to workpiece W through nozzle 204.

Movable member 252 is rotatably supported by movable member 232. Movable member 252 is rotated by servomotor 207E. The rotation of movable member 252 moves machine head 203 in C-axis direction. Machine head 203 is capable of changing the position or direction of C-axis direction.

Movable member 242 is rotatably supported by movable member 252. Movable member 242 is rotated by servomotor 207D about X-axis. The rotation of movable member 242 moves machine head 203 in A-axis direction. Machine head 203 is capable of changing the position or direction of A-axis direction.

According to such a configuration, controller 400 rotates machine head 203 in C-axis direction and A-axis direction, thereby controlling the pose of nozzle 204. Movable members 212, 222, 232, 242, 252 form a moving device for moving nozzle 204 three-dimensionally. The rotation of machine head 203 changes the direction in which nozzle 204 is directed, as illustrated with the broken lines in FIG. 2.

Figure 3:
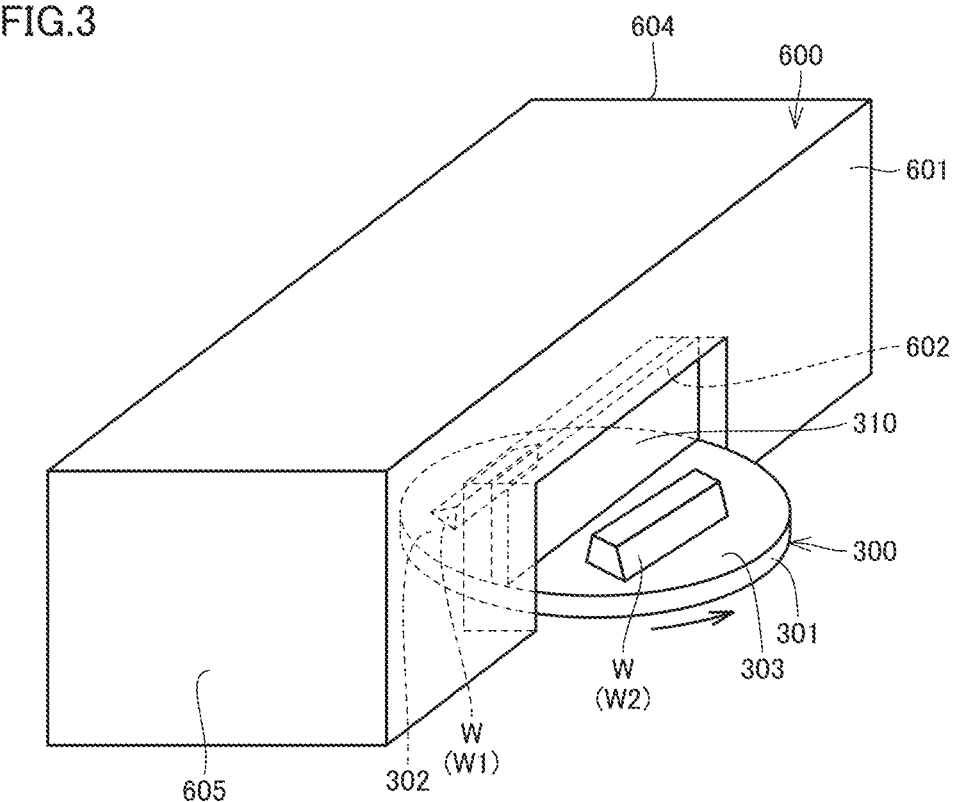
FIG. 3 is a perspective view showing a schematic configuration of a workpiece machining chamber.

FIG. 3 is a perspective view showing a schematic configuration of workpiece machining chamber 600. Laser emitting device 200, shown in FIG. 1, is accommodated in workpiece machining chamber 600. Workpiece machining chamber 600 has a side wall 601. A workpiece transfer port 602 is formed in side wall 601. Workpiece transfer port 602 is an opening extending through side wall 601. Workpiece transfer port 602 communicates the interior and the exterior of workpiece machining chamber 600. Workpiece transfer port 602 is formed in a recessed outer surface of side wall 601. Workpiece W is carried into and out of machining chamber 600 via workpiece transfer port 602.

Workpiece machining chamber 600 has side walls 604, 605 which are different from side wall 601. Side walls 604, 605 are provided with a door which is opened and closed when an operator enters the workpiece machining chamber 600, and a monitoring window through which an operator can look in the workpiece machining chamber 600 from the outside. These door and monitoring window are not shown in FIG. 3.

A workpiece transfer device 300 is provided in workpiece transfer port 602. Workpiece transfer device 300 is configured to carry workpiece W into and out of workpiece machining chamber 600.

Workpiece transfer device 300 has a turntable device 301 and a partition wall 310. Turntable device 301 is supported by a support 304, not shown in FIG. 3, from the bottom, and is configured to rotate in workpiece transfer port 602. The curved arrow shown in FIG. 3 indicates a direction of rotation of turntable device 301. Turntable device 301, shown in FIG. 3, is rotatable anti-clockwise as viewed from the top. Turntable device 301 may be rotatable about the center of rotation only in one direction, or may be rotatable in opposite directions.

Partition wall 310 is secured to the top surface of turntable device 301, and integrated with turntable device 301. Partition wall 310 is disposed, extending from the top surface of turntable device 301. Partition wall 310 partitions the top surface of turntable device 301 into multiple workpiece mounting tables 302, 303. Multiple workpiece mounting tables 302, 303 are defined by partitioning the top surface of turntable device 301 by partition wall 310. Workpiece W can be placed on each of the multiple workpiece mounting tables 302, 303.

As shown in FIG. 3, a workpiece W1 is mounted on workpiece mounting table 302. A workpiece W2 is mounted on workpiece mounting table 303. Workpiece W1 and workpiece W2 are mounted on the top surface of turntable device 301 with partition wall 310 inbetween.

In the arrangement shown in FIG. 3, workpiece mounting table 302 and workpiece W1 mounted on workpiece mounting table 302 are disposed in workpiece machining chamber 600. In the arrangement shown in FIG. 3, workpiece mounting table 303 and workpiece W2 mounted on workpiece mounting table 303 are disposed outside the workpiece machining chamber 600. Partition wall 310 obstructs workpiece transfer port 602. Partition wall 310 blocks workpiece transfer port 602, preventing the laser beam emitted from laser emitting device 200 from leaking through workpiece transfer port 602.

Partition wall 310 blocking workpiece transfer port 602 seals workpiece machining chamber 600, in which state, laser emitting device 200 is allowed to emit a laser beam to workpiece W1 for laser machining of the workpiece W1.

During the laser machining of workpiece W1, the operator removes machined workpiece W2 from workpiece mounting table 303 and places a new, unmachined workpiece W2 on workpiece mounting table 303.

As the laser machining of workpiece W1 is completed, turntable device 301 rotates. In conjunction with the rotation of turntable device 301, partition wall 310 integrally, rotationally moves, which opens workpiece transfer port 602. Rotation of turntable device 301 by 180 degrees allows machined workpiece W1 to pass through workpiece transfer port 602 out of workpiece machining chamber 600. At the same time, unmachined workpiece W2 passes through workpiece transfer port 602 into workpiece machining chamber 600. Along with the rotation of turntable device 301, workpiece W is carried into workpiece machining chamber 600 and another workpiece W is carried out of workpiece machining chamber 600 at the same time.

Rotation of turntable device 301 by 180 degrees also rotates partition wall 310 by 180 degrees. Along with the rotation of turntable device 301, partition wall 310 turns and blocks workpiece transfer port 602, in which state, partition wall 310 prevents the laser beam emitted by laser emitting device 200 from leaking out of workpiece machining chamber 600 through workpiece transfer port 602. This allows laser emitting device 200 to emit the laser beam to workpiece W2 for laser machining of workpiece W2.

During the laser machining of workpiece W2, the operator removes machined workpiece W1 from workpiece mounting table 302 and places a new, unmachined workpiece W1 on workpiece mounting table 302. As the laser machining of workpiece W2 is completed, turntable device 301 rotates again.

In this manner, workpiece W1 placed on workpiece mounting table 302 and workpiece W2 placed on workpiece mounting table 303 can be laser machined efficiently, thereby achieving an increased productivity. During the laser machining of workpiece W (W1, W2), workpiece transfer port 602 is blocked by partition wall 310. Accordingly, the laser beam is prevented from leaking out of workpiece machining chamber 600 through workpiece transfer port 602.

Figure 4:
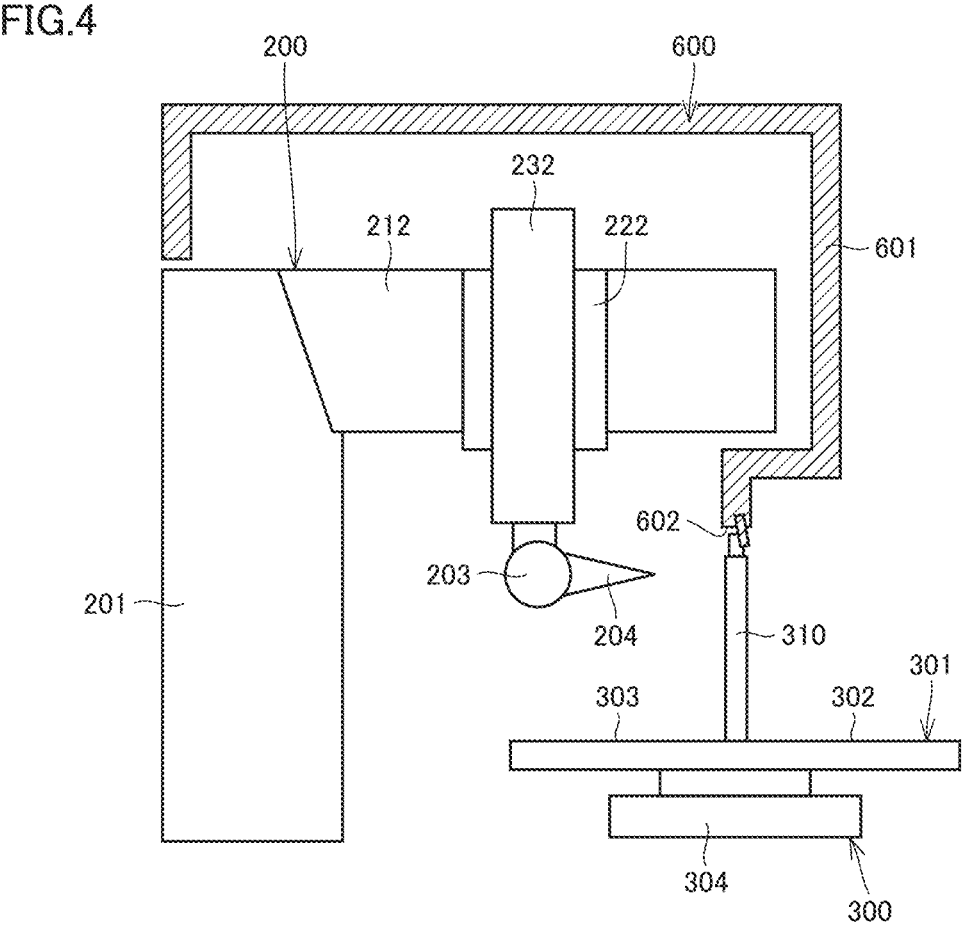
FIG. 4 is a fragmentary sectional view of the workpiece machining chamber shown in FIG. 3, as viewed from the side.
Figure 5:
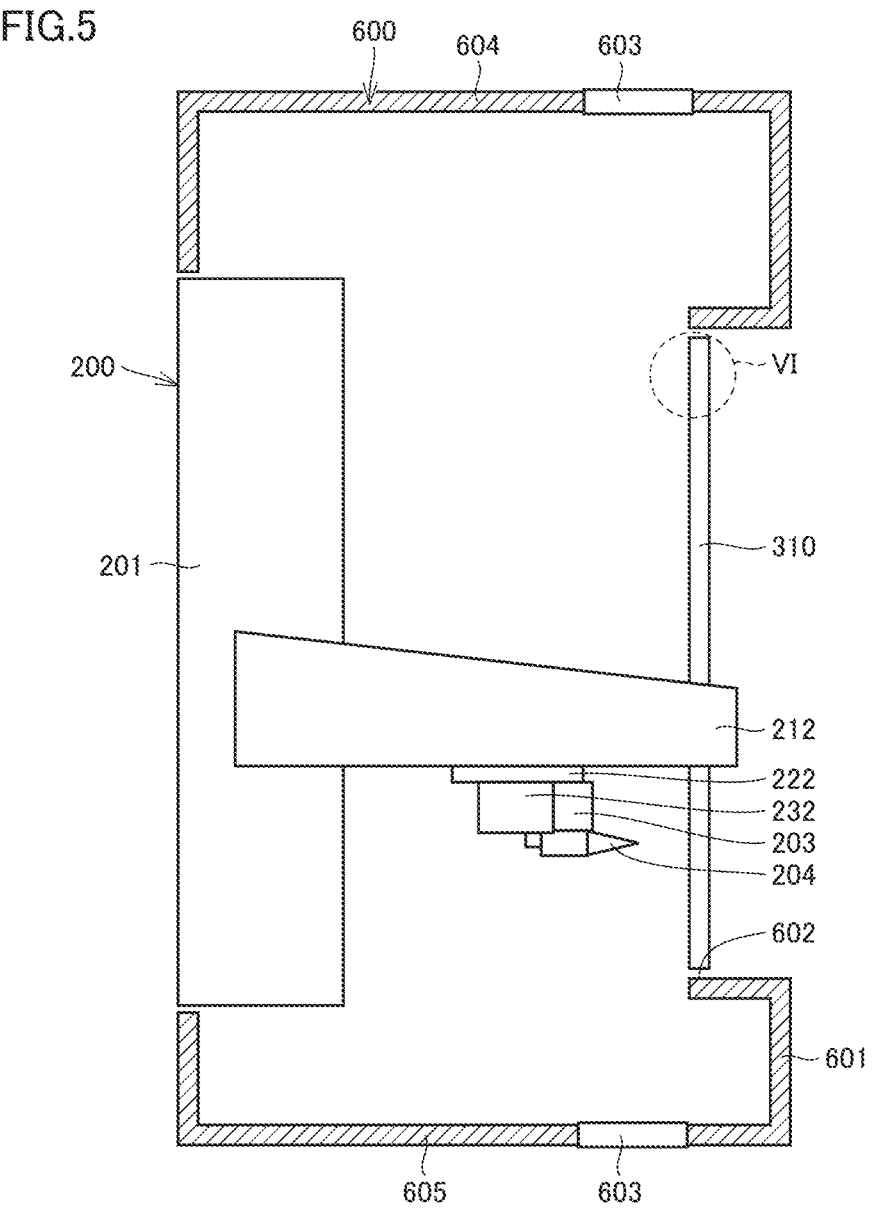
FIG. 5 is a fragmentary sectional plan view of the workpiece machining chamber shown in FIG. 3.

FIG. 4 is a fragmentary sectional view of workpiece machining chamber 600 shown in FIG. 3, as viewed from the side. FIG. 5 is a fragmentary sectional plan view of workpiece machining chamber 600 shown in FIG. 3. As described above, laser emitting device 200 is accommodated in laser machining chamber 600. Laser emitting device 200, while it is shown in simplified form in FIGS. 4, 5, has the same configuration as that of laser emitting device 200 shown in FIG. 1.

Partition wall 310 obstructs the opening (workpiece transfer port 602) formed in workpiece machining chamber 600. Workpiece machining chamber 600 and partition wall 310 form a protective housing for protecting laser emitting device 200 from the outside, and protecting the periphery of workpiece machining chamber 600 by blocking the laser beam emitted by laser emitting device 200. Workpiece machining chamber 600 and partition wall 310 make a division for the interior of workpiece machining chamber 600.

Side wall 604 of workpiece machining chamber 600, shown in FIG. 5, has a monitoring window 603. Side wall 605 has a monitoring window 603.

Nozzle 204, shown in FIGS. 4, 5, is directed to workpiece transfer port 602 that is formed in side wall 601. A moving device for moving nozzle 204 three-dimensionally, that is, movable members 212, 222, 232, 242, 252 are capable of moving nozzle 204 so that nozzle 204 is directed to workpiece transfer port 602. Nozzle 204 is directed to partition wall 310 of workpiece transfer device 300 that is blocking workpiece transfer port 602. As laser emitting device 200 emits a laser beam in the arrangement shown in FIGS. 4, 5, the laser beam is directed to workpiece transfer port 602 and emitted to partition wall 310. Laser emitting device 200 is configured to emit the laser beam to workpiece transfer port 602.

Figure 6:
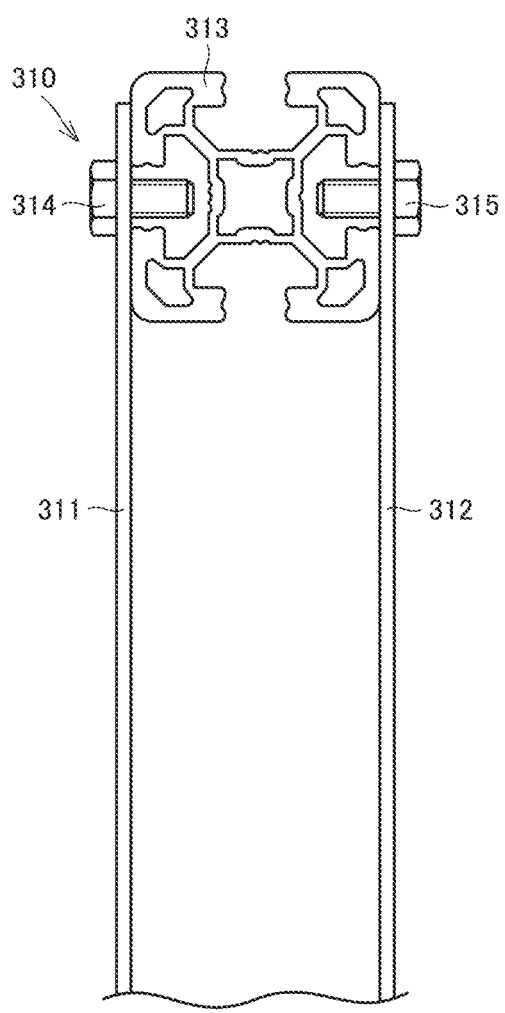
FIG. 6 is a fragmentary sectional view of a partition wall of a workpiece transfer device.

FIG. 6 is a fragmentary sectional view of partition wall 310 of workpiece transfer device 300. As shown in FIG. 6, partition wall 310 has a first plate 311 and a second plate 312. First plate 311 and second plate 312 each have a flat plate shape. First plate 311 forms one surface of partition wall 310. Second plate 312 forms the other surface of partition wall 310. One of first plate 311 and second plate 312 is disposed, directed to workpiece mounting table 302, and the other one of first plate 311 and second plate 312 is disposed, directed to workpiece mounting table 303.

First plate 311 and second plate 312 are formed of aluminum alloy. The aluminum alloy is an alloy based on at least 50 percentage by mass of aluminum, besides a small amount of component such as copper, manganese, silicon, magnesium, or zinc, for example. Aluminum alloys are numbered and classified, such as Al—Cu based alloy of an alloy number in the 2000 series, Al—Mn based alloy of an alloy number in the 3000 series, Al—Mg based alloy of an alloy number in the 5000 series, Al—Mg—Si based alloy of an alloy number in the 6000 series, and Al—Zn—Mg based alloy of an alloy number in the 7000 series, etc.

First plate 311 and second plate 312 are formed of any kind of aluminum alloy materials. Typically, first plate 311 and second plate 312 are formed of the same aluminum alloy material. First plate 311 and second plate 312 are formed of a material of the same quality.

Partition wall 310 has a frame 313. Frame 313 has a square pipe shape. Frame 313 secures first plate 311 and second plate 312. Frame 313 secures first plate 311 and second plate 312 in a spaced apart relationship. First plate 311 and second plate 312 are not in direct contact with each other, and are disposed spaced apart from each other in a direction of thickness of the plates.

First plate 311 is secured to frame 313 with a bolt 314. The thread of bolt 314 is screwed into the frame 313 and first plate 311 is sandwiched between the head of bolt 314 and frame 313. Second plate 312 is secured to frame 313 with a bolt 315. The thread of bolt 315 is screwed into the frame 313, and second plate 312 is sandwiched between the head of bolt 315 and frame 313.

Frame 313 is formed of aluminum alloy. Typically, frame 313 is formed of the same aluminum alloy material as that of one or both of first plate 311 and second plate 312.

Next, operational advantages of the present embodiment will be described.

According to laser machine 1 based on the embodiment, first plate 311 forming the one surface of partition wall 310 and second plate 312 forming the other surface of partition wall 310 of workpiece transfer device 300 are both formed of aluminum alloy, and they are disposed spaced apart from each other.

Aluminum alloy has a lower specific gravity than ferrous materials. First plate 311 and second plate 312 are formed of aluminum alloy, thereby allowing for reduction in weight of partition wall 310. Since partition wall 310 rotates integrally with turntable device 301, workpiece transfer device 300 having a partition wall 310 having a reduced weight, can speed up the carrying of workpiece W into and out of workpiece machining chamber 600 and reduce the power for rotating turntable device 301.

Compared to ferrous materials, aluminum alloy has high light reflectance and high thermal conductivity. Aluminum alloy is known as a material that is difficult to be laser machined, as compared to ferrous materials. Since first plate 311 and second plate 312 are formed of aluminum alloy having such characteristics, when the laser beam is emitted to partition wall 310 unintentionally, the laser beam hardly passes through the plate that is within the workpiece machining chamber 600.

Even if the laser beam passes through the plate within the chamber, the diameter of the through hole can be kept small. A portion of the laser beam reached the plate within the chamber does not pass through the through-hole, but instead emits the periphery of the through-hole, failing to reach the plate outside the workpiece machining chamber 600. This reduces the amount of energy of the laser beam reached the plate outside the chamber.

First plate 311 and second plate 312 being disposed spaced apart from each other increases the distance from a focus where the laser beam emitted by laser emitting device 200 is concentrated to the plate outside the chamber. The diameter of focus of the laser beam having reached the plate outside the chamber is increased, thereby causing the energy of the laser beam to be diffused.

Accordingly, in laser machine 1 according to the embodiment, the laser beam emitted to partition wall 310 is inhibited from passing through the plate outside the chamber. The laser beam is inhibited from passing all the way through partition wall 310 and leaking out of workpiece machining chamber 600, thereby achieving enhanced durability of partition wall 310 against the laser beam.

If the partition wall has only one plate, the plate needs to have an increased thickness to achieve the durability comparable to that of partition wall 310 according to the embodiment. For this reason, disadvantages is caused, such as an increased weight of the partition wall, an increased cost, etc. Disposing first plate 311 and second plate 312 spaced apart from each other like the partition wall 310 according to the embodiment achieves enhanced durability of partition wall 310, without increasing the thickness of the plate. Consequently, reduction in weight of partition wall 310 and cost reduction are achieved.

Laser machine 1 which includes turntable device 301 needs to secure a space for rotating the turntable device 301. In order to reduce the space, the center of rotation of turntable device 301 is closer to the interior side of workpiece machining chamber 600 than the outer surface of side wall 601, as shown in FIG. 4. Due to this, the distance from nozzle 204, through which the laser beam is emitted, to partition wall 310 is short.

Since partition wall 310 partitions workpiece mounting tables 302, 303, each time the machined workpiece W is carried out of workpiece machining chamber 600, the operator accesses the workpiece mounting table outside the chamber to replace workpieces W. Since the distance from nozzle 204, through which the laser beam is emitted, to partition wall 310 is short, when the laser beam is emitted to partition wall 310, the amount of energy of the laser beam having reached partition wall 310 is increased. However, the laser beam is inhibited from passing all the way through partition wall 310 according to the embodiment. Accordingly, the operator is able to safely access workpiece mounting tables 302, 303, and the efficiency in the replacement of workpieces W increases.

Moreover, use of the same material to form first plate 311 and second plate 312 results in first plate 311 and second plate 312, whichever is within workpiece machining chamber 600, acting the same when the laser beam is emitted to partition wall 310. Accordingly, the laser beam can surely be inhibited from passing all the way through partition wall 310, and enhanced durability against the laser beam irradiation is achieved.

Moreover, as shown in FIGS. 4, 5, nozzle 204 through which the laser beam is emitted is movable so as to be directed to workpiece transfer port 602. During laser machining, workpiece transfer port 602 is blocked by partition wall 310. Since the laser beam is emitted through nozzle 204 disposed, directed to partition wall 310, the amount of energy of the laser beam having reached partition wall 310 is increased. However, the laser beam is inhibited from passing all the way through partition wall 310 according to the embodiment. Accordingly, the effect of enhancing the durability against the laser beam irradiation can be can be achieved more prominently.

Moreover, frame 313 is formed of an aluminum alloy having a low specific gravity, thereby allowing for further reduction in weight of partition wall 310. Accordingly, workpiece W can be carried into and out of workpiece machining chamber 600 at an increased speed, and the effect of reducing the power for rotating turntable device 301 can be achieved more prominently.

The presently disclosed embodiment should be considered in all aspects illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST 1 laser machine; 200 laser emitting device; 203 machine head; 204 nozzle; 207A, 207B, 207C, 207D, 207E servomotor; 212, 222, 232, 242, 252 movable member; 300 workpiece transfer device; 301 turntable device; 302, 303 workpiece mounting table; 304 support; 310 partition wall; 311 first plate; 312 second plate; 313 frame; 314, 315 bolt; 400 controller; 500 oscillator; 600 workpiece machining chamber; 601, 604, 605 side wall; 602 workpiece transfer port; 603 monitoring window; and W, W1, W2 workpiece.

The invention claimed is:

1. A laser machine, comprising:
a laser emitting device for emitting a laser beam to a workpiece to machine the workpiece;
a workpiece machining chamber accommodating the laser emitting device and having a side wall having a workpiece transfer port through which the workpiece is carried into and out of the workpiece machining chamber; and
a workpiece transfer device for carrying the workpiece into and out of the workpiece machining chamber,
the workpiece transfer device having a turntable device configured to rotate in the workpiece transfer port, and a partition wall which is secured to a top surface of the turntable device for rotationally moving with the turntable device and for partitioning the top surface into a plurality of workpiece mounting tables on which the workpiece can be mounted, the turntable device having a center of rotation that is closer to an interior side of the workpiece machining chamber than to an outer surface of the side wall of the workpiece machining chamber,
along with rotation of the turntable device, the partition wall blocking the workpiece transfer port and preventing the laser beam emitted by the laser emitting device from leaking out of the workpiece machining chamber through the workpiece transfer port,
the partition wall having a first plate formed of aluminum alloy and forming one surface of the partition wall, a second plate formed of aluminum alloy and forming an other surface of the partition wall, and a frame for securing the first plate and the second plate in a spaced apart relationship, the side wall of the workpiece machining chamber having a recessed outer surface, and the workpiece transfer port being formed in the recessed outer surface, and the partition wall secured to the top surface of the turntable device blocking the workpiece transfer port formed in the recessed outer surface each time the turntable device rotates by 180 degrees.

2. The laser machine according to claim 1, wherein the first plate and the second plate are formed of a same material.

3. The laser machine according to claim 1, wherein the laser emitting device has a nozzle and emits the laser beam to the workpiece through the nozzle, the laser emitting device has a plurality of movable members configured to move the nozzle three-dimensionally, and the plurality of movable members are configured to move the nozzle so that the nozzle is directed to the workpiece transfer port.

4. The laser machine according to claim 1, wherein the frame is formed of aluminum alloy.

* * * * *